UNITED STATES PATENT OFFICE.

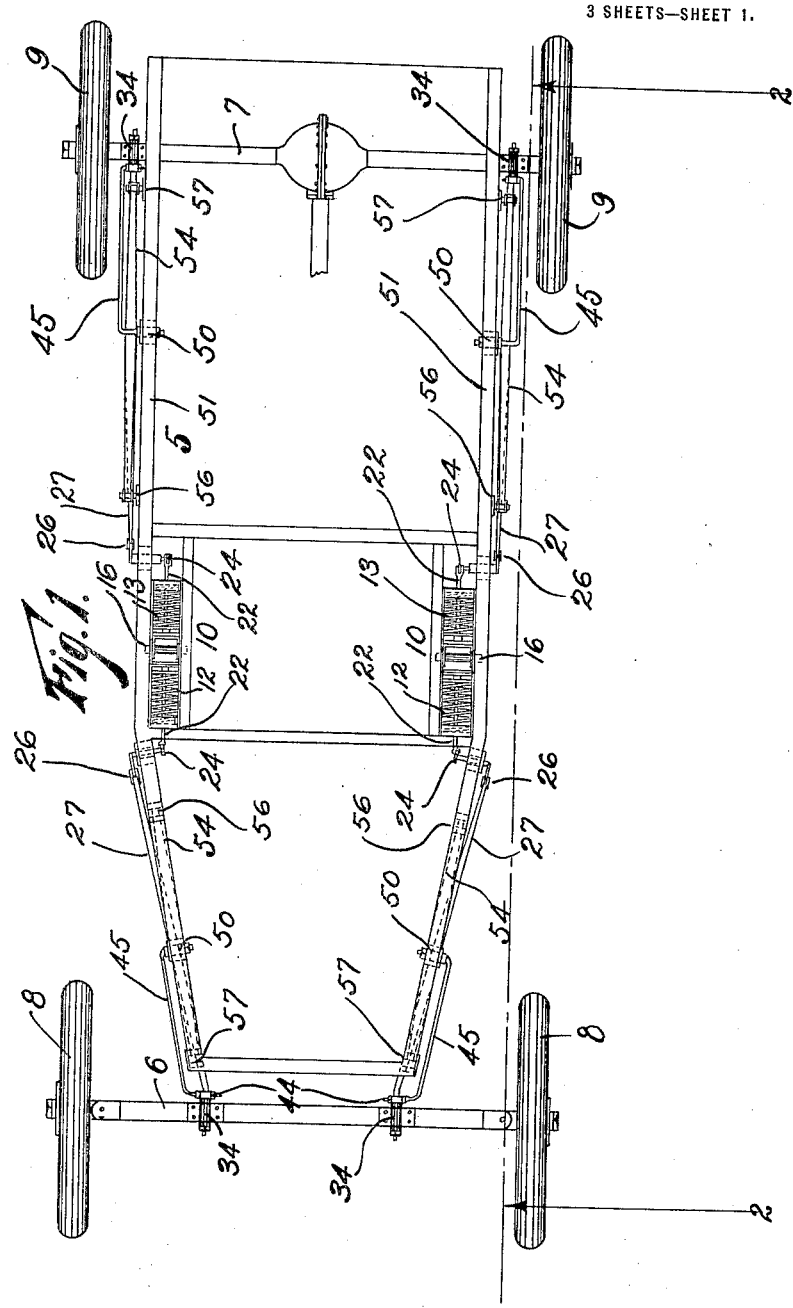

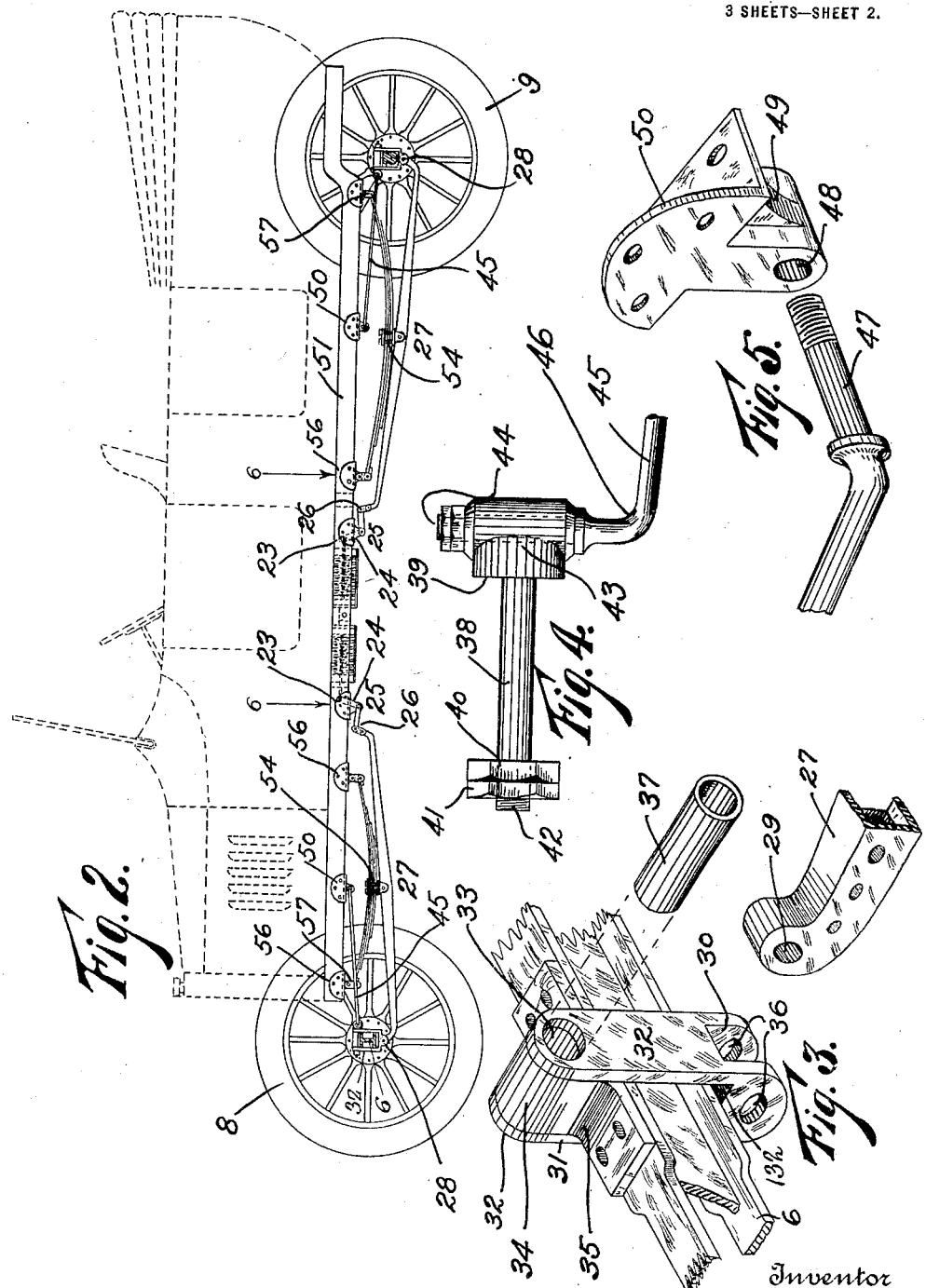

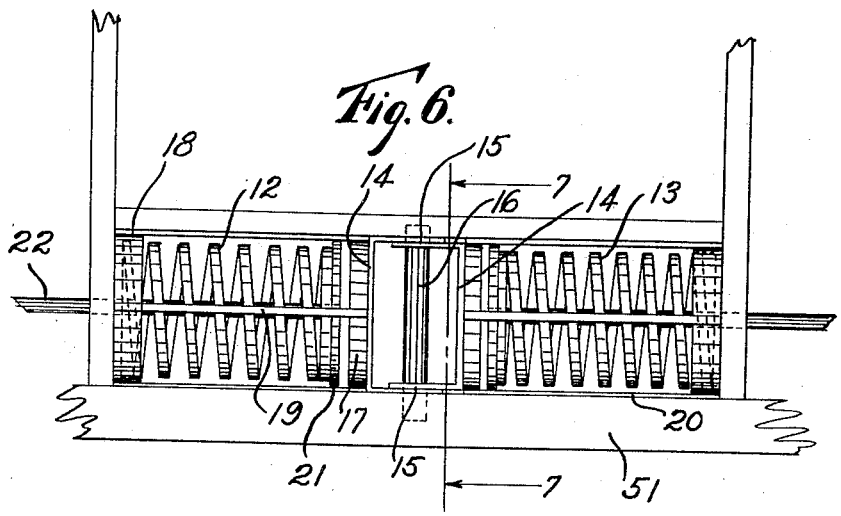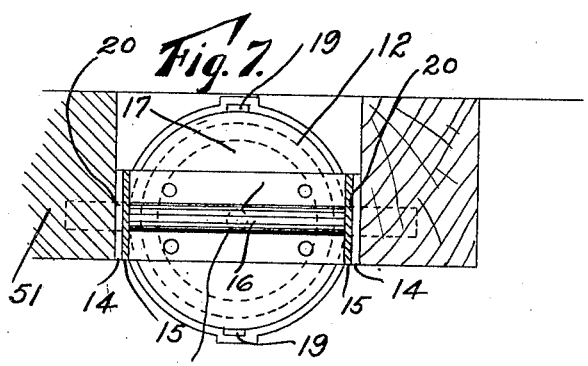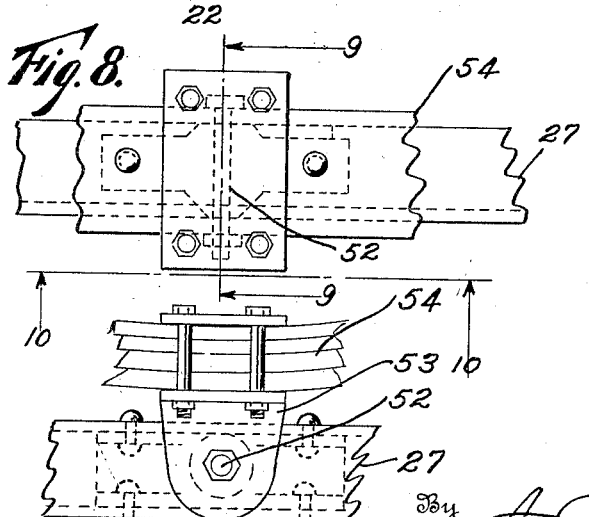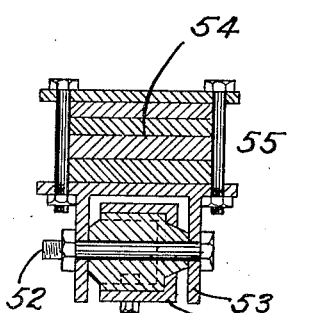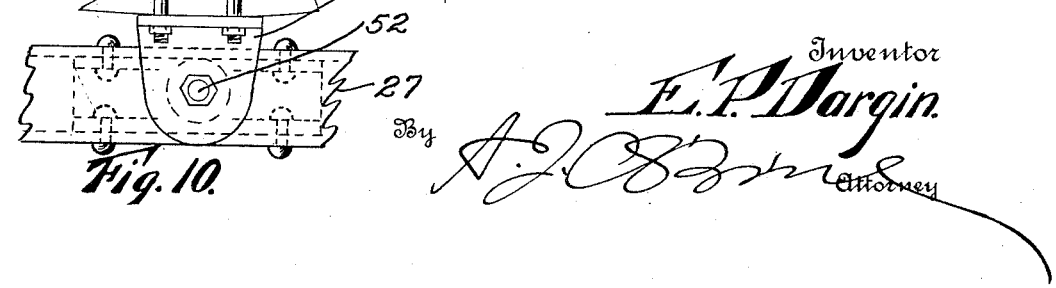

ERNEST P. DARGIN, OF DENVER, COLORADO.

SPRING MECHANISM FOR AUTOMOBILES AND OTHER VEHICLES.

1,346,300.  Specification of Letters Patent.  Patented July 13, 1920.

Application filed September 26, 1917. Serial No. 193,282.

*To all whom it may concern:*

Be it known that I, ERNEST P. DARGIN, a citizen of the United States, residing at the city and county of Denver and State of Colorado, have invented certain new and useful Improvements in Spring Mechanism for Automobiles and other Vehicles; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in spring mechanism for automobiles and other vehicles, my object being to provide a construction of this class which shall greatly reduce the shock, concussion or jar incident to the use of automobiles and similar vehicles. An important use of my improvement is in connection with heavy motor driven trucks which employ solid tires. In constructions of this class my improved spring mechanism obviates the necessity of the use of pneumatic tires and performs the necessary shock absorbing function.

Generally speaking my improvement consists in the employment of levers which coöperate with spring members arranged between the axles of the vehicle rather than directly over the same as in ordinary constructions. A lever is connected to the axle of the vehicle and fulcrumed on the center of a spring, the opposite end of the lever being attached to another spring fixed to the body of the vehicle, the spring upon which the lever is fulcrumed extending downwardly from the body. In other words, the construction consists of centrally located springs with which the levers are connected at one end where their opposite ends are connected with the axles of the vehicle, the levers being fulcrumed on depending springs located between the center of the vehicle and the axles. As illustrated in the drawing, the spring lever mechanism is practically duplicated both forward and in the rear of the center of the vehicle, the forward levers being connected with the forward axle, while the rear levers are connected with the rear axle, there being two levers connected with each axle, a fulcrum spring for each lever, and a spiral spring with which the inner extremities of the levers are connected in operative relation. It will be understood, however, that the invention is not limited to the special construction disclosed, but may be varied within the limits of the appended claims.

Having briefly outlined my improvement, I will proceed to describe the same in detail, reference being made to the accompanying drawing in which is illustrated an embodiment thereof. In this drawing:

Figure 1 is a top plan view of an automobile frame equipped with my improvement.

Fig. 2 is a side elevation of the same, the body of the vehicle being shown in dotted outline.

Fig. 3 is a perspective view illustrating a detail of construction, the parts being shown on a larger scale.

Fig. 4 is a detail view of a feature coöperating with the structure shown in Fig. 3.

Fig. 5 is a perspective view of a feature employed in connection with the structure shown in Figs. 3 and 4.

Fig. 6 illustrates one set of the centrally located spiral springs of my improvement, the same being shown on a much larger scale than in Figs. 1 and 2.

Fig. 7 is a section taken on the line 7—7, Fig. 6 looking toward the left, the parts being shown on a somewhat larger scale.

Fig. 8 is a fragmentary top plan view of one of the levers and the spring upon which it is fulcrumed, the parts being shown on a much larger scale than in Figs. 1 and 2.

Fig. 9 is a section taken on the line 9—9, Fig. 8.

Fig. 10 is a side elevation looking at Fig. 8 in the direction indicated by the arrows adjacent the line 10—10.

The same reference characters indicate the same parts in all the views.

Let the numeral 5 designate the skeleton frame work of the body of an automobile; 6 and 7 the front and rear axles and 8 and 9 the front and rear wheels.

Mounted approximately centrally of the machine are two sets of spiral springs, each set being designated in its entirety by the numeral 10. These sets of springs are substantially identical, hence the description of one set will be a description of both. Each set of springs consists of a front member 12 and a rear member 13. Each spring is mounted in a suitable frame or housing consisting of a U-shaped member 14 pivotally connected as shown at 15 with a pivot pin or spindle 16, the arms of the two U-shaped members 14 overlapping each other where they are perforated to receive the extremities of the spindle 16. Secured to the base of each U-shaped member 14 is a disk 17 which is arranged at the inner extremity of each spring, while a circular cup 18 is arranged to receive the opposite extremity of the spring, the cup 18 being secured to the frame work of the vehicle in any suitable manner. Extending between the members 17 and 18 are top and bottom guides 19 and side guides 20, thus forming a sort of skeleton housing for each spring, whereby the springs are securely maintained in position to properly perform their functions. Within this housing is located a sort of piston or cross head 21 which engages the inner extremity of each spring. Connected with this piston or cross head member is the inner extremity of a rod 22 whose opposite extremity is connected as shown at 23 with the arm 24 of a bell crank lever 25, the opposite arm of the bell crank being connected, as shown at 26, with the adjacent extremity of a lever 27, one of these levers being located in the front of the vehicle and the other in the rear, there being two levers 27, one on each side of the vehicle in both front and rear. However, each of these levers is substantially the same, arranged in the same manner and will be designated by the same reference characters, thus avoiding a double description. Each lever 27 is connected at its extremity remote from its corresponding bell crank lever, with an axle of the vehicle as shown at 28, the last named lever extremity being perforated, as shown at 29, and entering the bifurcated lower extremity 30 of a stirrup 31 whose arms 32 engage the axle on opposite sides, the upper extremities of these arms being perforated as shown at 33 to register with an eye 34 formed in a bearing 35 secured to the adjacent top portion of the axle, the axis of the eye extending crosswise of the axle or in the longitudinal direction of the vehicle. A suitable pivot pin or bolt is passed through the registering openings 36 formed in the bifurcated lower extremity of the stirrup, which perforations register with the perforation 29 of the lever, the pivot pin or bolt passing through such registering perforations, whereby a suitable connection is made between the axle and the adjacent extremity of the corresponding lever. A sleeve or bushing 37 is inserted in the registering openings in the upper extremity of the stirrup and the eye 34, while a spindle 38 is passed through the bushing 37, one of its extremities engaging a shoulder 39, while the other extremity bears against a nut 40, the latter being also engaged by a lock nut 41, the nuts being screwed upon the thread extremity 42 of the spindle member 38. This spindle member is integral with an enlargement 43 which is perforated horizontally to receive the spindle extremity 44 of a radius rod 45, the extremity of the rod being bent, as shown at 46, and the spindle 44 extending inwardly and approximately at right angles to the body of the said rod, the spindle 44 being journaled in the bearing 43, the rear extremity of the radius rod being bent inwardly and terminating in a spindle 47, which passes through an eye 48 formed in the depending part 49 of an angle bracket 50 which is secured to one of the chassis bars 51 in any suitable manner. By virtue of this construction the spindle extremities of the radius rod 45 are adapted to move freely in their respective bearings, while at the same time by virtue of the fact that the bearing 43 for the outer extremity of each of these rods has its spindle member 38 journaled in the longitudinally disposed opening of the stirrup 32 and bearing 34, either extremity of the axle may be raised higher than the other as by the engagement of a wheel with an obstruction on one side of the track without subjecting the parts of the vehicle to torsional or twisting strain, the stirrups 32 being mounted to maintain their vertical positions regardless of the transverse tilting of the axles of the vehicle.

Each lever 27 is centrally fulcrumed, as shown at 52, on a bracket 53 depending from the central portion 54 of a leaf spring 55 whose extremities are respectively pivotally connected with brackets 56 mounted on the adjacent chassis bar 51, the pivots for the spring extremities being respectively designated by the numerals 57.

From the foregoing description the use and operation of my improved shock absorbing spring mechanism will be readily understood. By virtue of the fact that the outer extremities of the radius bars 45 are journaled to turn in bearings whose axes are transversely disposed while the said bearings are equipped with spindles whose axes are longitudinally disposed, perfect flexibility is permitted under all circumstances in view of the fact, that the stirrups 32 are pivotally mounted at their upper extremities to enable them to maintain a vertical position regardless of the transverse tilting of the axles.

During the use of the vehicle, it will be understood that the shock, concussion or jar is taken up and minimized to the maximum degree by virtue of the arrangement of the springs 12 and 55, the levers 27 being fulcrumed on the latter while their inner extremities are connected with the former through the medium of the bell crank levers 25.

Attention is called to the fact that through the medium of my improved spring mechanism the load is approximately evenly distributed upon the vehicle, since the front and rear wheels are spaced farther apart, the springs being located between the axles and bearing upon the levers which are connected with the axles at one extremity and with the central portion of the chassis at their opposite extremities. This gives an approximately even distribution of the load upon the vehicle and at the same time minimizes to the maximum degree the concussion, shocks or jars incident to the use of the vehicles.

Having thus described my invention, what I claim is:

1. The combination with the chassis frame and axle of a vehicle, of radius rods pivotally connected directly with the frame at one extremity and with a bearing mounted on the axle at their opposite extremities, the rod extremities having axes extending parallel with the axis of the axle, the bearings having axes connected with the axle by pivots whose axes are disposed horizontally and crosswise of the axis of the axle to permit the axle to rock on said pivots.

2. The combination with the chassis frame and axles of a vehicle, of radius rods pivotally connected with the frame between the axles at one extremity and with bearings mounted on the respective axles at their opposite extremities, the axes of the extremities of the rods having axes parallel with the axes of the axles, the said bearings being connected with the axles by spindles whose axes extend horizontally and at right angles to the axes of the axles to permit the axle to rock on the spindles.

3. The combination with the chassis frame and axles of a vehicle, of radius rods pivotally connected with the frame between the axles at one extremity and with bearings mounted on the respective axles at their opposite extremities, the extremities of the rods having axes parallel with the axes of the axles, the said bearings being connected with the axles by spindles whose axes extend horizontally and at right angles to the axes of the axles, and levers pivotally connected with the axles at their outer extremities and to the frame at their inner extremities and springs suspended from the frame and on which the said levers are fulcrumed.

4. The combination with a chassis frame and an axle, of a spring on the frame, a lever fulcrumed on the spring having one end connected with the axle and the other end yieldingly connected with the frame, and a radius rod connected with the axle and with the frame, the connections of the lever and radius rod to the axle comprising a stirrup pivotally connected at one end with the axle by a pivot whose axis is at right angles to the axle and which includes a rotatable pivot pin, the outer end of the radius rod having a pivotal connection with one end of the pivot pin, the axis of the last named connection being parallel with the axle, the lever being pivotally connected with the other end of the stirrup on an axis parallel with the axle.

5. The combination with a chassis frame and an axle, of a spring suspended at its ends from the frame, a lever fulcrumed on the middle portion of the spring having the outer end connected with the axle, a longitudinally extending spring-controlled member mounted on the chassis frame, a connection between the inner end of the lever and said spring-controlled member and a radius rod connected with said frame and with said axle.

6. The combination with a chassis frame and an axle, of a spring suspended at its ends from the frame, a lever fulcrumed on the middle portion of the spring having the outer end connected with the axle, a longitudinally extending member mounted on the chassis frame, a spring-controlling reciprocation of said member, a connection between the inner end of the lever and said spring-controlled member, said connection comprising a bellcrank and a radius rod connected with said frame and with said axle.

7. The combination with a chassis frame and an axle of a spring on the frame, a lever fulcrumed on the spring having one end connected with the axle and the other end connected with the frame, and a radius rod connected with the axle and with the frame, the connection of the lever to the axle comprising a stirrup pivotally connected at one end with the axle by a pivot whose axis is at right angles to the axle, the lever being pivotally connected with the other end of the stirrup on an axis parallel with the axle, the connection of the radius rod to the axle comprising a pivot having an axis extending parallel with the axis of the axle, and a spindle connected with said pivot and mounted on the axle, the axis of the spindle extending horizontally and at right angles to the axle.

In testimony whereof I affix my signature.

ERNEST P. DARGIN.